(12) United States Patent
Huggins et al.

(10) Patent No.: US 7,398,945 B2
(45) Date of Patent: Jul. 15, 2008

(54) CAST UNITIZED PRIMARY TRUSS STRUCTURE AND METHOD

(75) Inventors: George L. Huggins, Wichita, KS (US); Brian J. Meyer, Wichita, KS (US); Lee J. Post, Wichita, KS (US); Gordon R. Crook, Towanda, KS (US); Scott N. Nelson, Derby, KS (US); Stanley T. Kampf, Andover, KS (US); Aaron R. Heitmann, Mukilteo, WA (US); Hafizullah Wardak, Wichita, KS (US); Daniel J. Allison, Wichita, KS (US); Joseph W. Camenzind, Wichita, KS (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/502,961

(22) Filed: Aug. 11, 2006

(65) Prior Publication Data

US 2007/0120010 A1    May 31, 2007

Related U.S. Application Data

(62) Division of application No. 10/867,417, filed on Jun. 14, 2004, now Pat. No. 7,104,306.

(51) Int. Cl.
*B64D 27/26*    (2006.01)
(52) U.S. Cl. ........................................................ 244/54
(58) Field of Classification Search ................... 244/54; 248/554, 555
See application file for complete search history.

(56) References Cited

U.S. PATENT DOCUMENTS

| | | | |
|---|---|---|---|
| 3,962,763 A | 6/1976 | Jury | |
| 4,612,066 A | 9/1986 | Levin et al. | |
| 4,728,059 A | 3/1988 | Stephen et al. | |
| 4,757,665 A | 7/1988 | Hardigg | |
| 5,062,589 A | 11/1991 | Roth et al. | |
| 5,108,045 A * | 4/1992 | Law et al. | 244/54 |
| 5,143,276 A | 9/1992 | Mansbridge et al. | |
| 5,157,915 A * | 10/1992 | Bart | 60/797 |
| 5,484,120 A * | 1/1996 | Blakeley et al. | 244/54 |
| 6,126,110 A * | 10/2000 | Seaquist et al. | 244/54 |
| 6,209,822 B1 * | 4/2001 | Le Blaye | 244/54 |

* cited by examiner

*Primary Examiner*—Rob Swiatek
(74) *Attorney, Agent, or Firm*—Harness, Dickey & Pierce, P.L.C.

(57) ABSTRACT

A truss structure well suited for use as an engine strut on a commercial aircraft. The truss structure is cast as a single piece integrally formed component from a titanium alloy or another suitably lightweight, structurally strong material. The truss structure includes a plurality of integrally formed attachment structures which enable the truss structure to be secured to an element of an aircraft such as a wing. A plurality of attachment areas for an element such as an engine is also formed that allows the element (e.g. jet engine) to be secured to the truss structure. The truss structure includes a plurality of elongated rails and truss elements that are arranged to provide redundant load paths to ensure that a failure of any one truss element or elongated rail will not result in a failure of the overall truss structure to support whatever load is required.

16 Claims, 3 Drawing Sheets

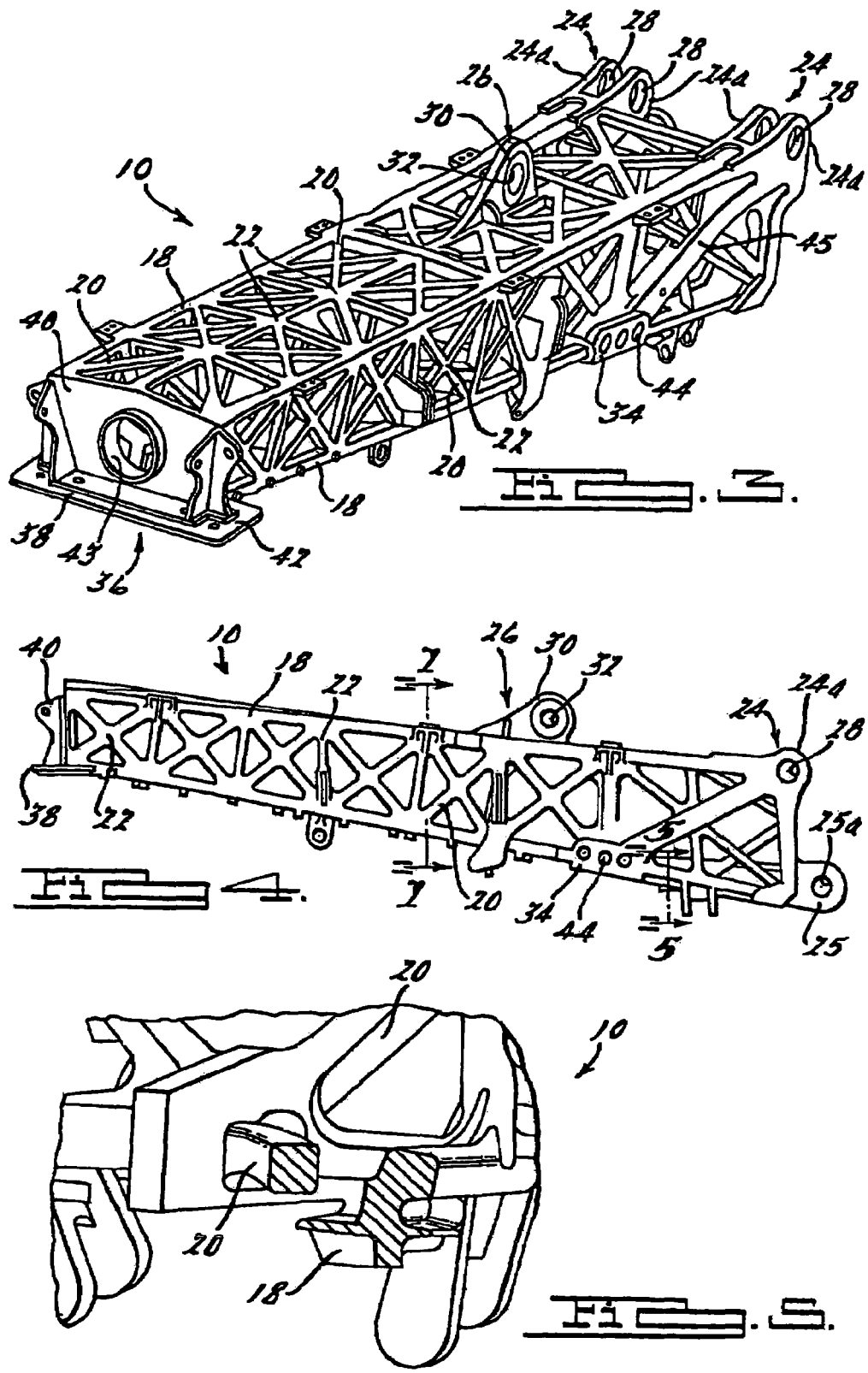

CAST UNITIZED PRIMARY TRUSS STRUCTURE AND METHOD

CROSS-REFERENCE TO RELATED APPLICATIONS

This application is a divisional of U.S. patent application Ser. No. 10/867,417 filed on Jun. 14, 2004. The disclosure of the above application is incorporated herein by reference.

FIELD

This disclosure relates to truss structures and, more particularly to a monolithic, cast truss suitable for forming a primary structure for a mobile platform such as an aircraft.

BACKGROUND

Large cast support structures have traditionally not been used in applications where fail-safe performance of the structure is required. One example of such an application would be in connection with the manufacture of large commercial aircraft. In such instances, large support structures, and particularly large support structures such as engine pylons, have been constructed with a large plurality of independent parts and fastening elements designed so that the failure of any one of the constituent parts does not result in failure of the entire structure. It has generally been believed that a monolithic structural support element, formed from a casting process, is not ideal for use as a primary component of an aircraft because of heretofore recognized inherent limitations with large, cast structures. More particularly, with previously developed large, cast structures, when such structures develop a crack, the crack may propagate through the structure in response to repeated cyclic loading on the structure. Thus, a failure beginning in one element of a large, cast support structure can eventually result in the failure of the entire structure.

Further limitations with large, cast structures involve the weight typically associated with such structures. Until the present time, the manufacture of a monolithic cast structural component has generally been made using steel or aluminum. In aircraft applications, where weight is of paramount importance, casting a large truss-like support structure from steel would yield a component that is simply unacceptably heavy.

Some large structural parts have been cast from aluminum, but aluminum also has drawbacks when attempting to apply it to components to be used with aircraft structures. Most notably, aluminum is not suitable for areas of an aircraft where the component will experience high heat, such as an engine pylon, which experiences significant heat generated by the jet engine.

The use of a large, cast structure as a primary structure on an aircraft would also significantly simplify the construction of modern day commercial aircraft. For example, an engine strut (i.e., pylon) which is used on an aircraft to attach an engine to a wing of the aircraft is typically assembled from a large plurality of independent, complex parts. For commercial aircraft, a typical engine strut is usually composed of a hundred or more independent parts, including various shims, which are held together by thousands of fasteners. The connections require extensive drilling of holes, corrosion protection and sealing of joints and fasteners. The cost of just the engine strut is a significant portion of the total cost of manufacturing an aircraft despite the structure being a relatively small fraction of the aircraft's total mass. Any manufacturing improvement that reduces the overall cost of such an assembly while maintaining a redundant structure that assures against failure, despite the structure being located in an environment of high loading, high sonic fatigue, high temperature, and corrosive gases, would be very desirable. Other examples of such applications might be the carry-through structure used to connect the right and left horizontal tail planes into a single structural assembly, supports for the landing gear, or attachment of fuel tanks or other external equipment to the aircraft (to name a few potential applications).

Accordingly, there is still a need for producing primary structural components for aircraft and other structures that are structurally strong and resistant to structural failure, yet which are lighter than present day structural assemblies. There is a particular need for such structural components that are also capable of handling the high loading, high fatigue, and highly corrosive environments experienced by various structures used in commercial aircraft applications.

SUMMARY

The present disclosure is directed to a truss structure that is suitable for use in commercial aircraft applications, but is not limited to such applications. The truss structure is cast as a single piece component from a lightweight, yet structurally strong material. In one preferred form the material is a titanium alloy. The truss structure is well suited for use as an engine strut on large commercial aircraft. Since the truss structure creates an integrally formed, single component part, it is more cost effective to produce, and more weight efficient than previously employed engine strut assemblies that involve hundreds of independent component parts held together by thousands of independent fasteners.

The truss structure of the present disclosure, in one construction, forms an engine strut as explained above. The truss structure includes a plurality of elongated rails. The rails are interconnected by a plurality of truss elements at various points along the rails forming truss nodes. The trusses themselves are interconnected at various truss connecting nodes. The truss structure includes at least one forward engine mounting attachment area integrally formed on the truss structure. At least one aft engine mount attachment area is formed at an aft area of the truss structure. A plurality of wing attachment areas are also formed on the truss structure at spaced apart locations. It will be appreciated that the wing attachment areas and the engine mounting attachment areas are precisely positioned on the truss structure in consideration of the specific type of aircraft that the truss structure will be used with and, in addition, the specific type of engine to be used with the aircraft.

A principal feature of the truss structure is that it is cast from a lightweight material, and in one preferred form from a titanium alloy, as a single piece, integrally formed structure. The elongated rails and truss elements of the structure are further arranged in consideration of the loads that will be experienced by the engine strut during operation of the aircraft, and more specifically to eliminate, or virtually eliminate, the risk of structural failure of the truss structure should one particular truss element develop a crack. Thus, the truss structure is designed to provide redundant load paths to better ensure that if a crack develops in any one particular truss element, the entire truss structure will still remain structurally sound.

The truss structure of the present disclosure can be used in a wide variety of applications and is therefore not limited to just those involving commercial aircraft. Virtually any application where a large, lightweight, integrally formed truss-like component would be desirable would form a potential application for the truss structure of the present disclosure.

The features, functions, and advantages can be achieved independently in various embodiments of the present disclosure or may be combined in yet other embodiments.

BRIEF DESCRIPTION OF THE DRAWINGS

The present disclosure will become more fully understood from the detailed description and the accompanying drawings, wherein:

FIG. 3 is a perspective view of the truss structure of FIG. 2;

FIG. 4 is a side view of the truss structure of FIGS. 1 and 2;

FIG. 5 is a cross-sectional view of a portion of the truss structure of FIG. 3 taken in accordance with section line 5-5 in FIG. 3;

DETAILED DESCRIPTION OF THE PREFERRED EMBODIMENTS

The following description of the preferred embodiment(s) is merely exemplary in nature and is in no way intended to limit the disclosure, its application, or uses.

Figure 1:
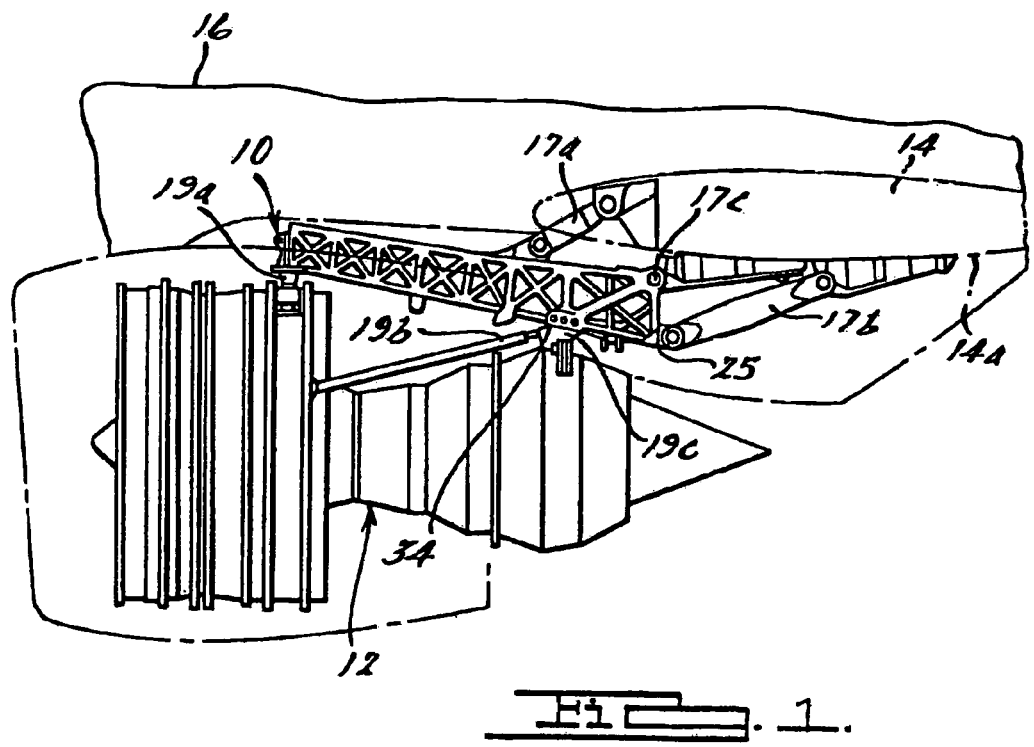
FIG. 1 is a simplified side view illustrating a truss in accordance with the present disclosure being used to secure a jet engine to an under surface of wing of a commercial aircraft.

Referring to FIG. 1, there is shown a simplified illustration of a truss structure 10 in accordance with a preferred embodiment of the present disclosure specifically adapted for use as an engine strut or pylon on a commercial aircraft. The truss structure 10, in this example, is used to secure a jet engine 12 to an under surface 14a of a wing 14 of a commercial aircraft 16 via links 17a and 17b. Links 19a, 19b and 19c secure the jet engine 12 to the truss structure 10.

Figure 2:
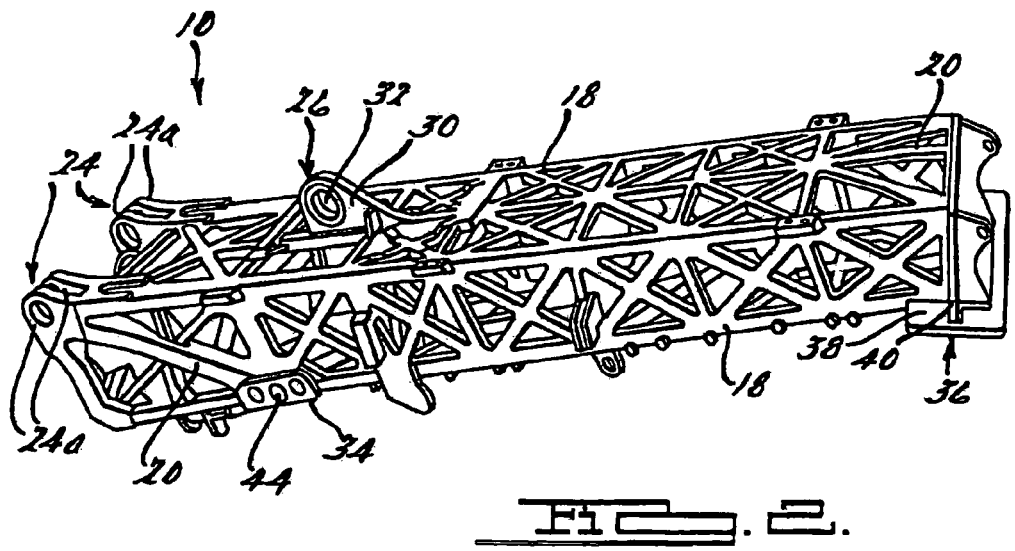
FIG. 2 is a perspective view of a truss structure forming a engine strut in accordance with a preferred embodiment of the present disclosure.
Figure 6:
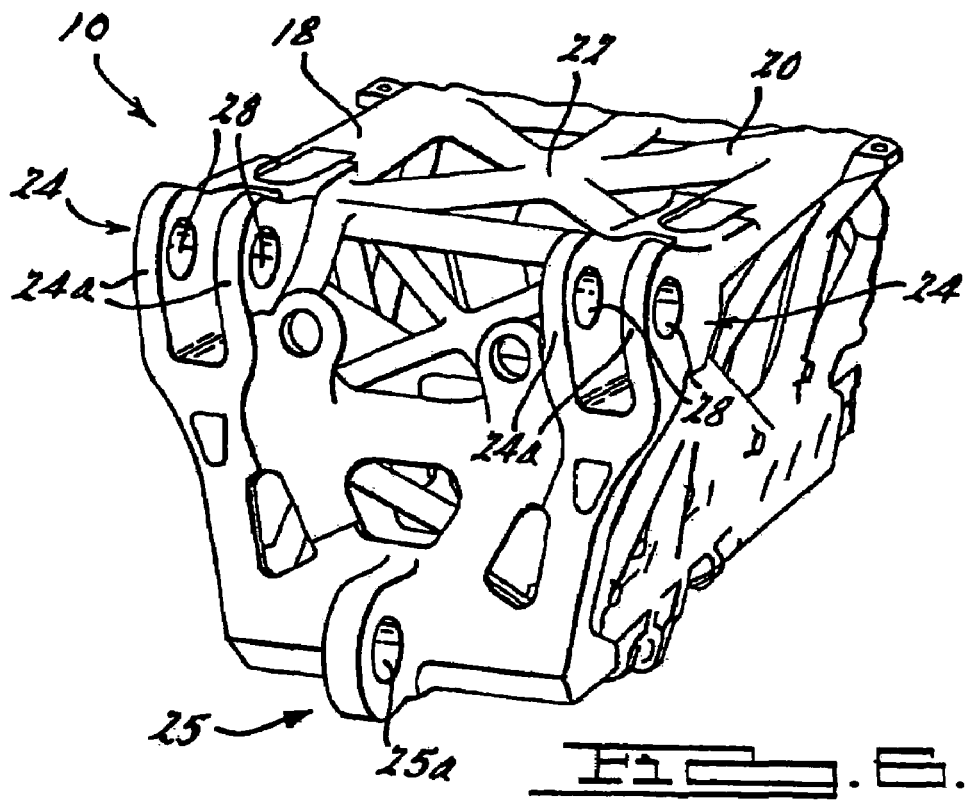
FIG. 6 is a perspective view of just the end of the truss opposite that shown in FIG. 3.

Referring to FIGS. 2-4, the truss structure 10 is shown in greater detail. The truss structure 10 includes a plurality of elongated, tubular rails 18 arranged to form an overall generally rectangular shaped piece when viewed from one end of the truss structure 10. The elongated rails 18 are preferably either circular in cross-section or have a quadrilateral cross-sectional shape with rounded corners to allow easier filling of a casting mold used to form the truss structure 10. However, other cross-sectional shapes for the elongated rails 18 could also be employed.

The elongated rails 18 are intercoupled by a plurality of truss elements 20. Each of the truss elements 20 is similarly preferably formed with a circular cross-sectional shape or a rounded quadrilateral cross-sectional shape to better facilitate molding. The truss elements 20 are further arranged so as to be interconnected at a plurality of truss nodes 22. One or more of the truss nodes 22 can be used to form a "gating" location into which molten titanium material can be injected into the mold used to form the truss structure 10. The molding of the truss structure 10 will be discussed in further detail in the following paragraphs. The interconnection of the truss elements 20 and elongated rails 18 cooperatively form a structurally strong and rigid, single piece component that is also light in weight when compared to similarly sized structures made as built-up assemblies of individual parts. The layout of the truss elements 20 is preferably formed through a computer aided design system and tailored to accommodate the loads that the truss structure 10 will need to support.

A particular advantage of the truss structure 10 is that, when properly designed and sized, if any one truss element 20 or elongated rail 18 should develop a crack, or worse yet break completely through, the entire truss structure 10 will still be capable of supporting the required loads. Rather, the structural integrity of the overall truss structure 10 will not be tangibly reduced or compromised by a crack or a break of any one of the truss elements 20. The truss structure 10 effectively provides redundant load paths that allows the loads experienced by the truss structure 10 to be redistributed through the remaining truss elements 20 in the event one of the truss elements 20 should fail. This advantageous feature makes the truss structure 10 well suited for use as a primary support structure on a commercial aircraft.

Figure 7:
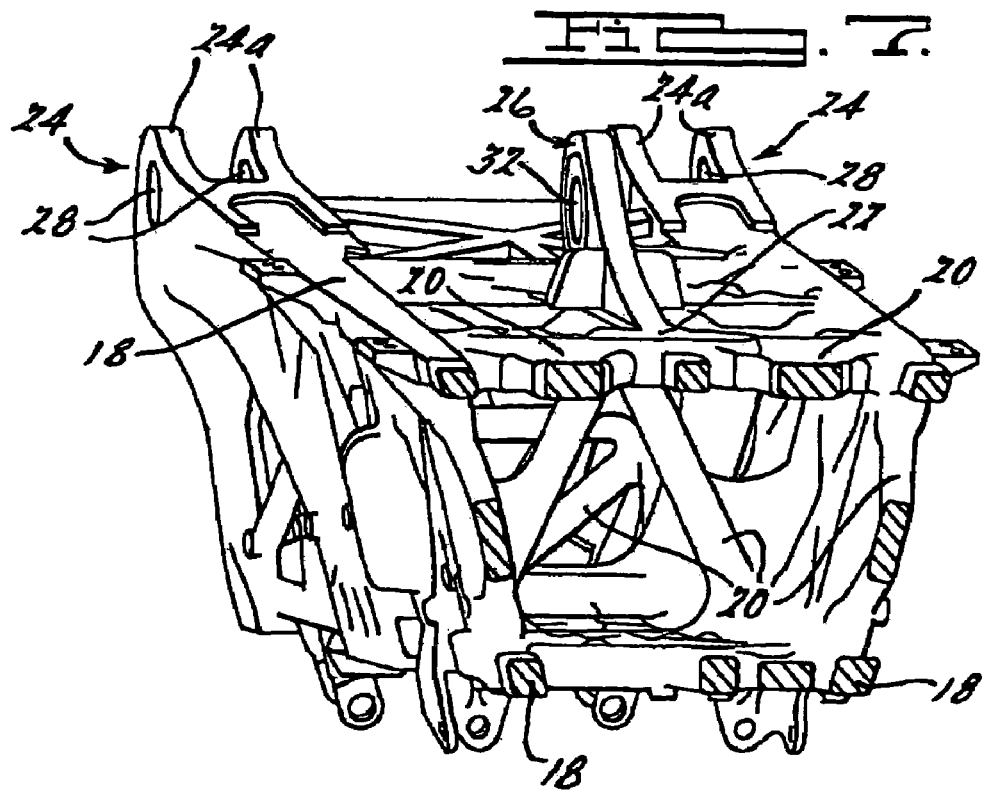
FIG. 7 is a cross-sectional view of a portion of the truss in accordance with section line 7-7 in FIG. 4.

Referring specifically to FIGS. 3, 4 and 7, the truss structure 10 includes forward wing attachment areas 24 and 26. Areas 24 are each comprised of a pair of parallel lugs 24a forming a clevis-like structure, with each of the lugs including a plurality of aligned openings 28 for receiving an external mounting element 17c used to secure the truss structure 10 to the wing 14 (FIG. 1). Wing attachment area 26 is formed by a single lug 30 having an opening 32 which is likewise used for attaching the truss structure 10 to the link 17a that attaches to the leading edge spar of wing 14. A wing attachment area 25, which attaches to link 17b that is attached to the rear of wing 14, and which is shown in FIG. 4, similarly forms a lug having an opening 25a for securing to one end of link 17b.

With further reference to FIGS. 3 and 4, the truss structure 10 also includes an aft engine mount attachment area 34 and a forward engine mount attachment area 36. Forward engine mount attachment area 36 is comprised of plates 38 and 40. Plate 38 includes a plurality of openings 42 for allowing a forward portion of a specific jet engine to be secured thereto, such as via structure 19a in FIG. 1.

Aft engine mount attachment area 34 is formed at one of the truss nodes 22 and includes a plurality of openings 44. While only a single aft engine mount attachment area 34 is illustrated in each of FIGS. 3 and 4, it will be appreciated that the truss structure 10 includes a pair of such areas 34 opposed from one another on opposite sides of the truss structure 10. The aft engine mount attachment areas 34 are used to secure the aft portion of the jet aircraft engine 12 to the truss structure 10, such as via structures 19b and 19c.

The forward mounting areas 36, 38, 42 and 43 of the truss structure 10 carry the majority of the engine inertial loading and a fraction of the engine failure loading during a blade-out event. The aft engine mount attachment areas 34 carry the thrust loads and the remainder of the engine loading and engine failure loading during a blade-out event. This load is transferred through the truss structure 10 to the rear of the truss structure where it is passed onto the wing through the wing mounted attachment areas 24, 25 and 26. It will be appreciated that the truss structure 10, at the aft attachment areas 24, 25 and 26, is subject to high static, dynamic and sonic loading, as well as to elevated temperatures, generated by the jet engine 12 which it is supporting.

It is a principal advantage of the truss structure 10 that it is cast from a lightweight material, preferably from a titanium alloy such as that designated as Ti-6AL-4V. It will be appreciated that there are many other titanium alloys that could also be used within the scope of this disclosure to suit the particular needs of a specific application. Titanium is not only light in weight, but is well suited for corrosive environments such as those found in aircraft applications, and even more particularly as support structures for jet engines. As will be appreciated, jet engines generate significant heat, and the support structures used to support jet engines from the wings of an aircraft must be able to tolerate a significant degree of heat without having its structural integrity compromised.

In molding the truss structure 10, a suitable mold is charged with titanium that is heated to a suitable molding temperature. The use of circular or rounded quadrilateral cross-sectional shapes for the truss elements 20 and the elongated rails 18 helps to facilitate rapid filling of the mold and inhibits the tendency towards early solidification of the mold material which might otherwise occur in thinner areas of the components of the truss structure 10. As the molten titanium is allowed to cool and contracts, additional material is fed through the gating locations of the mold to prevent the formation of voids in the titanium. material. For the structure illustrated in FIGS. 2-5, the molding process works well with a lessened tendency to develop any sink flaws that might otherwise be present with other cast structures. The use of circular or rounded quadrilateral shaped cross-sections for the truss elements 20 and/or the elongated rails 18 further facilitates modeling of the truss structure 10 with a computer aided design program and the filleting between elements is both easier to model and to cast.

It will be appreciated that post-molding steps includes stripping away ceramic molding material from the truss structure 10, dipping the truss structure in an acid bath to remove surface contaminants, and then performing non-destructive inspection (NDI) of the structure. NDI inspection would involve X-rays for detecting small flaws in the structure, and if any such flaws are found, grinding them out and the resulting depression filled in by welding, and then re-inspecting by further X-rays. The structure 10 would typically then go to a hot isostatic pressure (HIP) chamber where any small voids in the part would be filled in (i.e., healed). Subsequently, the structure 10 would go through a heat treatment to remove any residual stresses and finally a plurality of acid baths to get the casting down to a final weight before shipping. Shot-peening and final machining of various surfaces are also typically required, along with further NDI operations.

Another advantage of forming the truss structure 10 in a single, integrally formed component through a casting process is the ability to place additional material at various points on the structure where needed to account for the inherent variability of the casting process. Subsequent machining operations, such as drilling of holes, or otherwise machining out a precise geometry needed for the attachment of mating parts can be easily performed. Since these areas of additional material are localized on the truss structure 10, the extra weight added is small in relation to the overall weight of the truss structure 10.

Still another advantage of casting the truss structure 10 as a single piece component is the ability to place major load bearing elements directly between the interface where the load is applied and the interface where it is reacted. For example, element 45 in FIG. 3 is the primary load transfer element between the applied load at the aft mount (element 44) and where it is reacted at the wing through element 24. This makes for an efficient structure, and also one that is typically more efficient than can be made from a structure comprised of a large plurality of independent, built-up sub-assembly components.

It will be appreciated that since the truss structure 10 is cast as a single piece component that the time to assemble the truss structure 10 is dramatically reduced over that needed to assemble a conventional engine strut. The need for corrosion protection to be applied to the large plurality of independent components of a conventional engine strut is also eliminated with the truss structure 10. In addition, there are significantly fewer machining operations required on the truss structure 10, such as drilling and sealing of various subcomponents that are typically required with a conventional engine strut made of a large plurality of independent components.

Still other important advantages of the truss structure 10 are excellent inspectability (by X-ray, N-ray, visual and dye penetrant), and improved reparability. The configuration of the truss elements 20 allows all interior elements to be easily reached and seen during repair. Excellent producibility also allows easy internal access and attachment of various tubing and wiring or other components for optimum packaging.

Yet another important advantage of the truss structure 10 is the ease with which the structure facilitates analysis of its various components. Automated structural analysis and sizing using Knowledge Based Engineering (KBE) means that every element of the structure 10 can be analyzed and a full structural integrity check made of each member of the structure. This may be done readily by using a fine mesh finite element model to check stress concentrations at various points on the truss structure 10. A damage tolerance analysis can also be easily accomplished.

The truss structure 10 of the present disclosure thus forms a lightweight, economically manufactured structural component that is ideally suited for harsh and demanding environments. While the truss structure 10 has been described in connection with a engine strut used on a commercial aircraft, it will be appreciated that the truss structure could just as easily be employed in various other forms of mobile platforms, such as ships, trains, buses, and other airborne vehicles, or even in fixed structural applications where lightweight, structurally strong components are needed.

While various embodiments have been described, those skilled in the art will recognize modifications or variations which might be made without departing from the inventive concept. The examples illustrated in the present disclosure are not intended to the description provided herein. Therefore, the description and claims should be interpreted liberally with only such limitation as is necessary in view of the pertinent prior art.

What is claimed is:

1. A monolithic, cast engine strut for supporting a jet engine from a wing of a mobile plafform, comprising:
    a plurality of elongated rails;
    a plurality of truss elements secured to selected ones of said elongated rails at a plurality of connection nodes;
    at least one integrally formed wing attachment structure for securing said engine strut to said wing;
    at least one integrally formed engine mount attachment structure for securing said jet engine to said engine strut; and
    wherein said at least one engine mount attachment structure comprises at least one generally planar plate with at least one opening for attachment to a portion of said jet engine.

2. The engine strut of claim 1, wherein said engine strut comprises titanium alloy.

3. The engine strut of claim 1, wherein said at least one engine mount attachment structure comprises an engine mount attachment structure disposed at a forward portion of the engine strut.

4. The engine strut of claim 1, wherein said at least one engine mount attachment structure comprises an engine mount attachment structure disposed at an aft portion of the engine strut.

5. The engine strut of claim 1, wherein said at least one wing attachment structure comprises:

a pair of generally parallel disposed lugs formed at one end of said engine strut.

6. The engine strut of claim 5, wherein said lugs are formed at an aft end of said engine strut.

7. The engine strut of claim 1, wherein said at least one wing attachment structure comprises first and second spaced apart attachment areas forming a clevis-like arrangement, with each of said first and second spaced apart attachment areas having an attachment lug for attachment to said wing.

8. The engine strut of claim 7, wherein one of said first and second attachment areas is disposed at an intermediate point along a longitudinal length of said engine strut.

9. The engine strut of claim 7, wherein said elongated rails comprise four elongated rails disposed generally parallel to one another.

10. A monolithic, cast engine strut for supporting a jet engine from a wing of a mobile platform, comprising:
    a plurality of elongated rails;
    a plurality of truss elements secured to selected ones of said elongated rails at a plurality of connection nodes;
    at least one integrally formed wing attachment structure for securing said monolithic, cast engine strut to said wing;
    at least one integrally formed engine mount attachment structure for securing said jet engine to said monolithic, cast engine strut;
    said at least one engine mount attachment structure including;
    a forward engine mount attachment structure formed at a forward end of said monolithic, cast engine strut; and
    an aft engine mount attachment structure formed at an aft end of said monolithic, cast engine strut.

11. A monolithic, single piece, integrally formed truss structure for supporting a subassembly of a jet aircraft from a body portion of said jet aircraft, said truss structure comprising:
    a plurality of elongated rails;
    a plurality of truss elements secured to selected ones of said elongated rails at a plurality of connection nodes;
    at least one integrally formed first attachment structure for securing said truss structure to a predetermined portion of said body portion of said jet aircraft;
    at least one integrally formed second attachment structure for securing said subassembly to said truss; and
    wherein said at least one second attachment structure comprises a pair of mounting structures disposed adjacent opposite longitudinal ends of said truss structure.

12. The truss structure of claim 11, wherein said elongated rails, said plurality of truss elements and said attachment structures are cast in a casting process to form a unitary assembly.

13. The truss structure of claim 12, wherein said truss structure is cast from a titanium alloy.

14. The truss structure of claim 11, wherein said at least one first attachment structure comprises a plurality of spaced apart attachment mounting structures forming a clevis-like arrangement for securing said truss structure to said predetermined portion of said body portion of said jet aircraft.

15. The truss structure of claim 14, wherein each of said spaced apart mounting structures includes an opening for receiving a fastening component for assisting in securing said truss structure to said jet aircraft.

16. The truss structure of claim 11, wherein each of said mounting structures includes at least one opening for each receiving an associated fastener to assist in securing said truss structure to said jet aircraft.

* * * * *